United States Patent Office 3,289,402
Patented Dec. 6, 1966

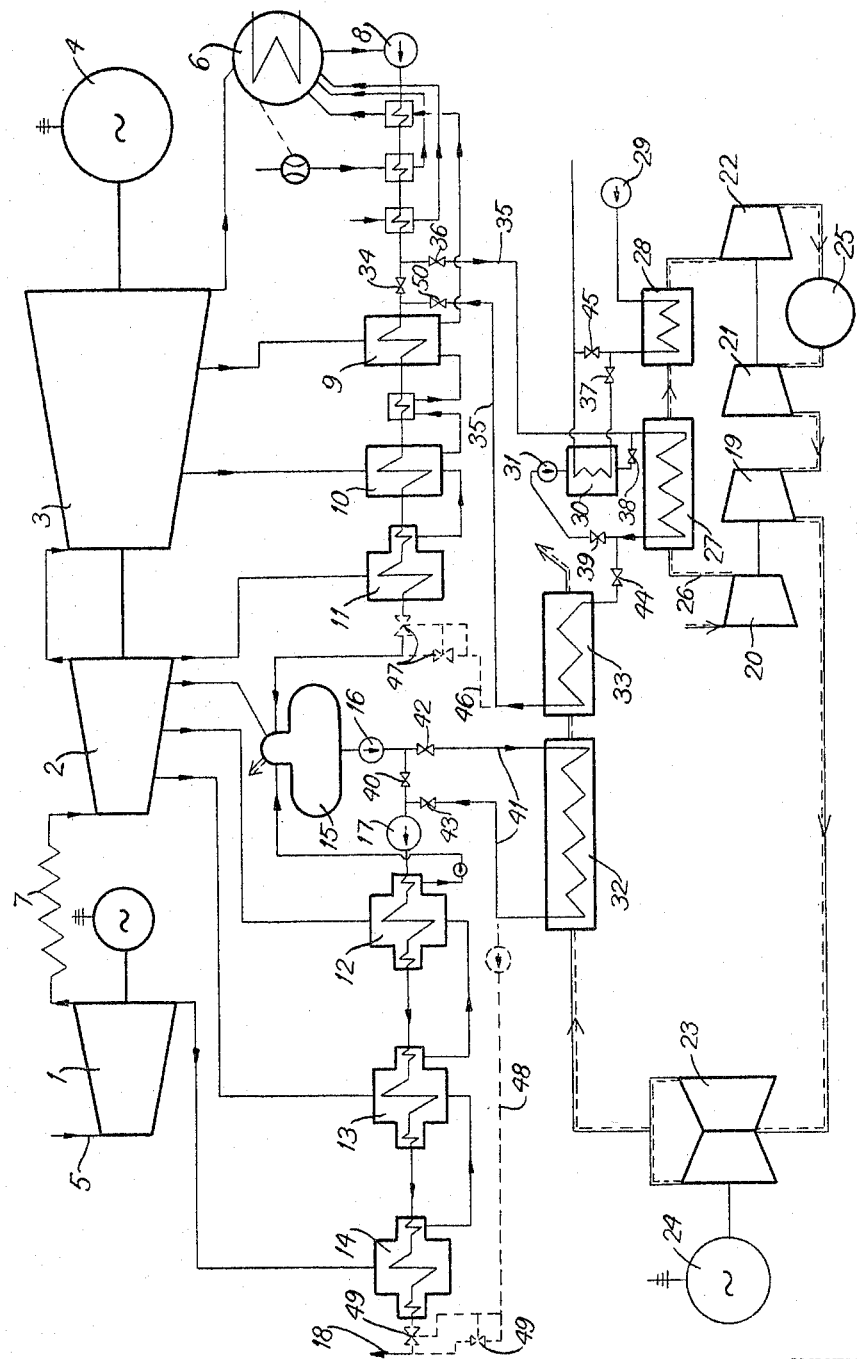

3,289,402
THERMAL POWER INSTALLATION
Ingvar Karl Einar Jung and Lars Erik Elmenius, Finspong, Sweden, assignors to Stal-Laval Turbin AB, Finspong, Sweden
Filed Dec. 3, 1964, Ser. No. 415,719
Claims priority, application Sweden, Dec. 20, 1963, 14,290/63
5 Claims. (Cl. 60—39.18)

The present invention relates to a thermal power plant comprising a steam turbine with generator, condenser and preheater for heating condensate by means of steam drawn from the turbine, and gas turbine with generator and one or more compressors. The steam and gas turbines have separate shafts and are constructed for operation either in combination, in which case heat is transferred from a compressor intercooler and/or an exhaust gas heat changer to the condensate from the steam turbine, or separately.

The invention is illustrated in the schematic diagram shown in the accompanying drawing.

The steam turbine installation comprises a high-pressure turbine 1 driving a generator, an intermediate-pressure turbine 2 and a low-pressure turbine 3 driving a generator 4. Steam is fed to the turbine 1 from a boiler not disclosed in the drawing, through a pipe 5 and passes in sequence into the turbines 2 and 3 to a condenser 6. An intermediate superheater 7 is located between the turbines 1 and 2.

The condensate from the condenser 6 is pumped in a conventional manner by a pump 8 through a series of preheaters 9, 10, 11, 12, 13 and 14 for heating by means of steam taken from the turbines. Between the preheaters 9, 10 and 11, the so-called low-pressure preheaters, and the heaters 12, 13 and 14, the so-called high-pressure preheaters, is connected a de-aerator 15, in which air is separated in the usual manner. After the de-aerator the condensate pressure is increased by means of a booster pump 16 and a feed pump 17. The condensate returns to the boiler through the pipe 18.

The gas-turbine installation comprising a low-pressure turbine 19, drives a low-pressure compressor 20, a high-pressure turbine 21 driving a high-pressure compressor 22, and a power turbine 23 driving a generator 24. A combustion chamber is indicated at 25. An intercooler 27 and a final cooler 28 are connected to a pipe 26 between the compressors 20 and 22. Cooler 28 is fed cooling water by means of the water pump 29. In order to make it possible to run the gas turbine only, an auxiliary cooler 30 can be connected. In this case the coolant of the intercooler is recirculated in a closed cycle by cooling water pump 31. The auxiliary cooler is water-cooled and connected in series to the final cooler 28 through a valve 37. The exhaust gas from turbine 23 passes through an exhaust gas heat exchanger consisting of one high-pressure part 32 and one low-pressure part 33.

A stop valve 34 is connected to the condensate pipe ahead of the first preheater 9. Condensate can be conducted through a pipe 35 with valves 36 and 50—with valve 34 closed and valves 36 and 50 open—to the intercooler 27 and to the low-pressure part 33 of the exhaust gas heat exchanger, coupled in series with the intercooler, for heating. Valves 37, 38 and 39 are then closed.

A stop valve 40 is located on a pipe from de-aerator 15 to preheater 12. Condensate can be conducted through a pipe 41, with valve 40 closed and valves 42 and 43 in pipe 41 open, to the high-pressure part 32 of the exhaust gas heat exchanger.

The valve positions are as follows:
When operating only the steam turbine the valves 34 and 40 are open. Valves 36, 50, 42 and 43 are closed.

When operating only the gas turbine, the valves 37, 38 and 39 are open and pump 31 is running. Valves 36, 50, 42 and 43 as well as valves 44 and 45 are closed. The exhaust gas heat exchanger has then been drained into a drain tank, not shown in the diagram, in order to be heated dry.

When operating coupled steam and gas turbines, the valves 36, 50, 44, 42 and 43 and 45 are open. Valves 34, 40, 37, 38 and 39 are closed.

The coupling-up has no effect on the steam cycle when the gas turbine is not running. As the gas turbine is started up and load applied, condensate and feed water will be heated and the steam bleed to the preheaters thus decreased.

Steam pressure and temperature in the preheaters correspond to the saturation pressure of the steam at respective bleed points on the steam turbine. The amount of bleed steam is automatically adjusted to the amount and temperature of the colder medium so that the temperature of the colder medium after the preheater will be a few degrees lower than the bleed steam.

As the condensate and feed water is heated in the gas turbine the bleed amounts are gradually reduced. The proposed coupling arrangement thus results in an adjustment of the bleed amount without requiring the installation of special units.

The steam turbine generator is over-dimensioned in order to yield the full output produced with closed bleed points. Alternately, the gas turbine generator and associated electrical equipment (transformers and switchgear) are dimensioned to accept the apparent output of the gas turbine (active and reactive output) as well as the reactive output, which corresponds to the value by which the apparent output of the steam turbine generator exceeds design data, when the normal feed water preheating has been completely or partially substituted by the exhaust gas heat exchangers and/or intercoolers of the gas turbine installation.

Alternatively, as shown by the dotted line 46, the intercooler 27 and the low-pressure part 33 of the exhaust gas heat exchanger can be coupled in parallel with preheaters 9, 10 and 11. Two valves 47 are connected to the pipe 46 and the main condensate pipe respectively, and regulated by the temperature in pipe 46 ahead of valve 47. In a similar manner the high-pressure part 32 of the exhaust gas heat exchanger can be coupled in parallel with preheaters 12, 13 and 14 by means of a pipe 48 and the two valves 49.

In summary, the following features can be considered to define the advantages of the invention:

The gas turbine installation and the steam turbine installation can be operated in combination or completely independent of each other.

In combined operation the exhaust gas heat exchangers can be fully or partly utilized for preheating feed water for the steam installation in which case the amount of steam bled to the preheaters decreases.

In combined operation the gas turbine intercooler is utilized fully or partially for preheating feed water for the steam installation and the amount of steam bled to the low-pressure feed-water preheaters decreases.

The gas turbine gas heat exchanger is coupled in front of and in series with the high-pressure preheaters of the steam installation.

The gas turbine intercooler, and possibly also the low-pressure part of the exhaust gas heat exchanger, are coupled up between or in front of and in series with the low-pressure preheaters of the steam installation.

The feed pump of the steam installation comprises a booster pump and a high-pressure pump with the high-pressure part of the gas turbine exhaust gas heat exchanger coupled up between said pumps.

The gas turbine generator is dimensioned so that it can absorb both the active and reactive output of the gas turbine and the extra reactive output that will be transmitted from the steam turbine generator by complete or partial disconnection of the feed-water preheaters. Alternatively the steam turbine generator is over-dimensioned in order also to yield the extra output produced by complete or partial substitution of the normal feed-water preheaters by exhaust gas heat exchangers and/or intercooler of the gas turbine installation.

The gas turbine is dimensioned to give an output corresponding to between 20 and 40% of that of the steam power installation.

Having thus described an embodiment of the invention, it is obvious that the same is not to be restricted thereto, but is broad enough to cover all structures coming within the scope of the annexed claims.

What we claim is:

1. A thermal power installation comprising, a steam power arrangement including a steam turbine with a generator, condenser and preheaters for heating condensate by means of steam drawn from the turbine, a gas turbine with a generator, the steam power arrangement and the gas turbine being adapted for either combined or separate operation, the gas turbine installation having compressors and exhaust heat exchangers having means to preheat condensate and feed water respectively, said heat exchanger being coupled in series with and ahead of the preheaters and having means by which full amounts of condensate and feed water respectively, pass through both the gas heat exchanger and preheaters, means by which low pressure is attained in one group of the preheaters and means for attaining high pressure in a second group, means by which high pressure is attained in one part of the heat exchanger and means by which low pressure is obtained in another part thereof, the low pressure part of the heat exchanger being coupled up in series with and ahead of the low pressure preheaters, the high pressure part of the heat exchanger being coupled up in series with and ahead of the high pressure preheaters, a booster pump and a feed pump coupled up in series ahead of the high pressure preheaters, the high pressure part of the heat exchanger being coupled up in series with and between the pumps in such a manner that they can be by-passed only when the steam turbine is in operation.

2. An installation according to claim 1, and including an intercooler for cooling the compressor air, with the intercooler being coupled up in series with and ahead of the preheaters for heating the condensate.

3. An installation according to claim 2, in which the intercooler is divided into one condensate-cooled part, and one final cooler which is cooled conventionally.

4. An installation according to claim 3, wherein the condensate-cooled part of the intercooler is connected to an auxiliary cooler that is cooled in a conventional manner, in such a way that the coolant for the intercooler is made to flow in a closed cycle through the intercooler and auxiliary cooler only when the gas turbine is in operation.

5. An installation according to claim 2, wherein the intercooler is coupled up in series with the exhaust gas heat exchanger.

References Cited by the Examiner

UNITED STATES PATENTS

| 2,663,144 | 12/1953 | Nordstrom | 60—39.18 |
| 3,095,699 | 7/1963 | Baver | 60—39.18 X |
| 3,164,958 | 1/1965 | Pacault | 60—39.18 |
| 3,194,015 | 7/1965 | Pacault | 60—39.18 |

MARK NEWMAN, *Primary Examiner.*

RALPH D. BLAKESLEE, *Examiner.*